Sept. 3, 1929.  L. P. KELLER  1,726,741
ACCESSORY FOR VACUUM CLEANERS
Filed Jan. 4, 1928
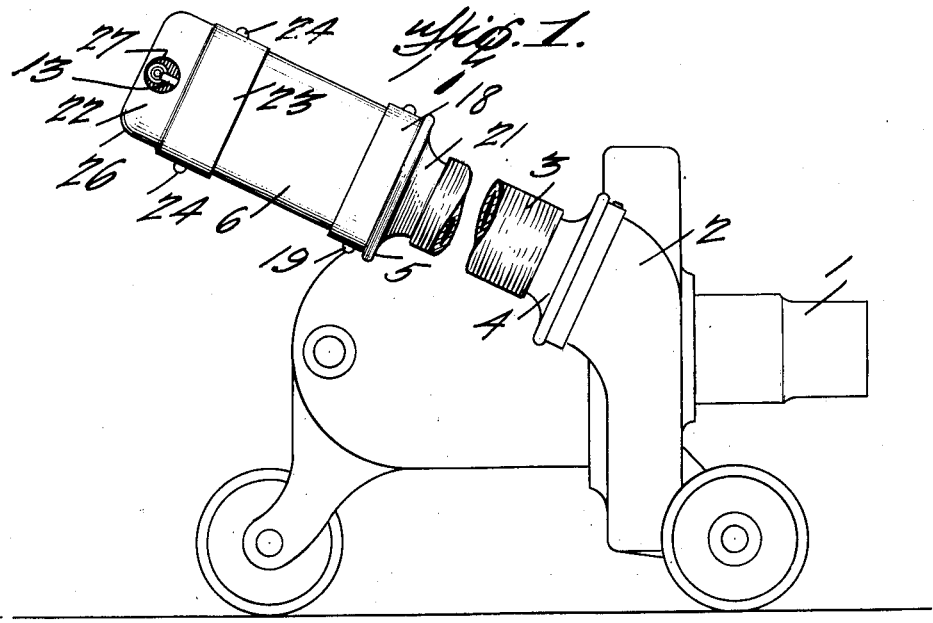
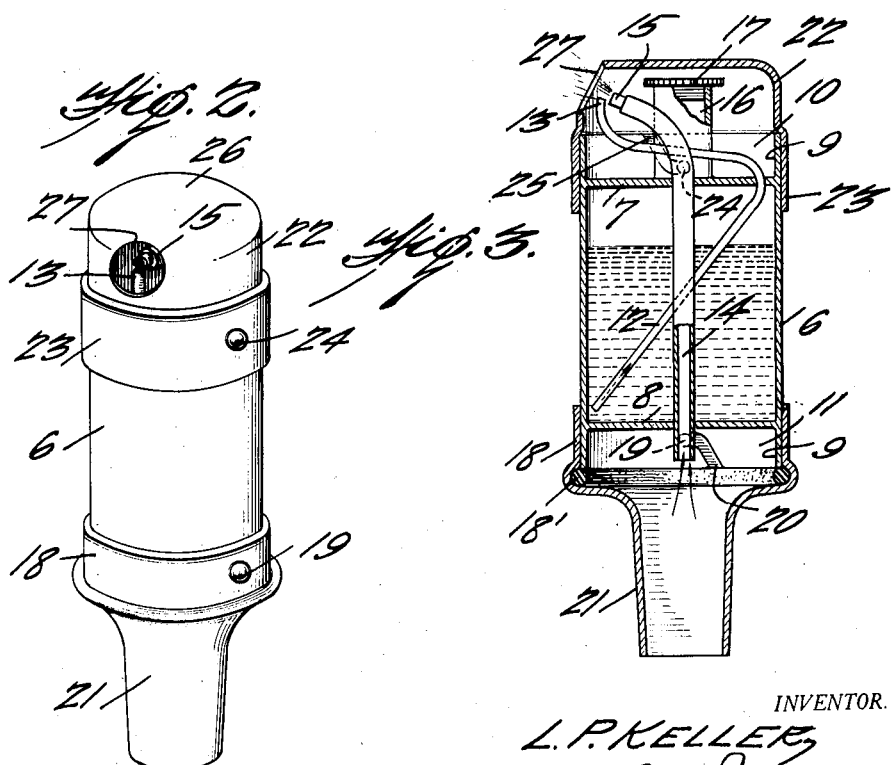
INVENTOR.
L. P. KELLER
BY
ATTORNEY.

Patented Sept. 3, 1929.

1,726,741

UNITED STATES PATENT OFFICE.

LEO P. KELLER, OF COLUMBUS, OHIO.

ACCESSORY FOR VACUUM CLEANERS.

Application filed January 4, 1928. Serial No. 244,486.

This invention relates to an accessory in the nature of an attachment for vacuum cleaners and the like, whereby the blower effect of such cleaner may be utilized for generating and directing a germicide and insecticide spray, either or both, to any desired point of application.

Vacuum cleaners as cleaning implements utilize a blower to create the necessary suction to draw dirt and refuse through the cleaners and into a refuse bag, the blower pressure being also utilized at will through certain attachments for blowing accumulated dust or dirt from articles to be cleaned. It is proposed to utilize this blower pressure and direct the air under such pressure through an attachment formed as a spraying device and adapted to contain a quantity of germicide, insecticide, or disinfectant, so that the spray developed by the air under pressure may, by a proper handling of the attachment, be directed onto any desired article or in any place or places where such treatment is desired.

The invention, therefore, has for its principal object the provision of a spraying device constructed particularly to permit it to be used as an attachment for vacuum and like cleaners, wherein through the use of the usual attachment hose provided with the cleaner, the sprayer may be connected to utilize the air under pressure from the blower for atomizing the contained chemical and directing the spray thus produced under considerable pressure to the point of use.

The invention is illustrated in the accompanying drawings, in which:

Figure 1 is a broken perspective view showing a particular type of vacuum cleaner, with the improved accessory connected therewith.

Figure 2 is an enlarged perspective view of the accessory.

Figure 3 is a vertical section through the accessory.

The vacuum cleaner illustrated in the drawings is designed to represent any known type of a device for cleaning through the power of suction or blowing wherein the air pressure is developed within the machine through the use of a suitable blower or fan, generally electrically operated.

In the type shown, when the device is used as a vacuum cleaner, the cleaning implements are connected to the suction side 1 of the blower and the air laden with the dust or dirt drawn in is delivered through the outlet or blower side 2 ordinarily into a container in the shape of a bag (not shown). Practically all types of vacuum cleaners have the bag arranged for removable connection with the blower outlet 2 and there are provided auxiliary accessories which may be connected to the blower outlet 2 or to the suction inlet 1.

These accessories usually include a proper length of non-collapsible hose 3 formed at one end with a suitable connector 4 arranged to interfit with an appropriately formed portion of the outlet 1 or 2 so that the hose may be readily connected to either of these parts as desired. With the hose are usually provided various types of implements which, through the flexibility of the hose, may be moved over wide areas by hand for cleaning purposes. These implements are to be connected with the hose 3 at the end remote from the suction inlet or blower outlet, the said end of the hose being preferably thickened and formed more or less as a gripping connector 5.

The improved accessory forming the subject-matter of this application is designed to be removably connected to the terminal end 5 of the hose 3 and to utilize the air under pressure passing through the hose for atomizing the germicide or insecticide and directing it with more or less force to the point of application. The spraying attachment comprises a cylindrical body 6 provided at the top and bottom with transverse partitions 7 and 8, the wall 9 of the body extending in both directions beyond the respective partitions to thereby provide upper and lower skirts 10 and 11.

The body within the wall 9 and between the partitions 7 and 8 provides a container for the germicide or other chemical and a delivery tube 12 for such chemical passes through and is secured in the upper partition 7, its lower open end terminating slightly above the bottom partition 8 and preferably adjacent the wall 9. The upper end of the delivery tube extends beyond the upper partition, being projected laterally across the partition and then vertically as a delivery end 13.

It will be noted that the lower open end of the delivery tube is more or less directly beneath the delivery end 13 of such tube and that said delivery tube from its open lower end is extended diagonally of the container and passes through the top partition 7 at a point diagonally opposite the open lower end of the tube, said tube above the partition being extended upwardly and then diagonally of the partition and terminates in an upwardly extending delivery end 13 which is directly above the inlet end of the tube. By this means, gravital delivery from the container during the use of the spray is prevented.

An air pipe 14 is secured in the upper and lower partitions, its lower open end terminating below the lower partition and about centrally thereof. The air pipe passes through and is secured in the upper partition and is then bent laterally and terminates in a reduced air delivery end 15 which is arranged to direct the air across the delivery end 13 of the delivery tube 12. The upper partition is provided with a filling opening 16 preferably in the form of a tubular member passing through the upper partition and provided at its upper end with a removable sealing cap 17 having the usual air vent.

The accessory includes a connector whereby the spraying device proper may be connected to the hose 3. This connector includes a cylindrical band 18 of a size to snugly embrace the lower skirt 11 of the sprayer body, said band being formed with diametrically opposed pins 19 to seat in angle slots 20 in said skirt 11 whereby the connector may be removably interlocked with the sprayer body at will.

The connector includes a continuation of the cylindrical band of gradually reduced diameter terminating in a tubular projection 21 of a size to fit within the terminal 5 of the hose 3, this tubular projection being of slightly increased diameter from its free end to insure an air-tight connection with the hose. A sealing member 18' is arranged within the band 18 to be engaged by the lower edge of the skirt 11 when the connector is applied to the sprayer body. Air leakage is thus prevented between the connector and sprayer body.

The attachment also includes a head 22 adapted to be removably secured to the upper end of the sprayer proper, this head including a circular band 23 adapted to snugly embrace the upper skirt 10 of the body 6, said band having pins 24 to seat in angle slots 25 in the skirt 10 to thereby removably secure the head in place. Above the band 23, the head is of closed, dome-like form, as at 26, and is formed with an opening 27 which is in direct line with the reduced delivery end 15 of the air pipe 14, so that the atomized chemical is directed through such opening 27 in the use of the attachment.

In the use of the attachment, the hose 3 is connected to the blower end 2 of the cleaner and the attachment connected to the free end of the hose by inserting the tubular projection 21 of such attachment into the hose end to insure a non-leaking fit. Air under pressure from the blower is then directed through the hose and through the air pipe 14. Such air pressure in passing through the reduced delivery end 15 of such air pipe reduces the air pressure in the direction of flow of the fluid, to thereby cause the atmosphere on the fluid within the body of the sprayer to force the chemical through the delivery tube 12 and through the outlet end 13. At such outlet end, the chemical is met by a transversely directed column of air under pressure which atomizes the material and directs the same in the form of a spray through the opening 27. The attachment as a whole is of a size to be conveniently held in the hand so that the spray passing through the opening 27 may be readily directed to any point of application.

It is particularly important to note that the attachment delivers the germicide or other chemical in the form of a spray, as distinguished from a gas. Ordinarily, a gas is effective only at the moment of application as it immediately dissipates into the surrounding atmosphere. With a spray, however, liquid particles adhere to the article or surface against which the spray is directed with the effect to maintain the desired efficiency of the germicide, insecticide, or disinfectant until such is evaporated. Thus, ordinarily a very much more effective germicidal, insecticidal, or disinfectant property is provided through the use of a spray than by means of a gas.

It is of course evident that a spray under pressure will force the atomized liquid or chemical in a manner to cause such liquid or chemical to penetrate porous materials. Under these circumstances, the evaporation of the liquid or chemical is comparatively slow in action in that quantity within the material for the reason that it is substantially cut off from the circulation of air.

This cleaner accessory or spraying device is designed especially in the interests of health protection and for the reconstruction of germ-laden and malodorous air in public places, for destroying exhaled breath germs and perfuming the air, being particularly useful in those places which, by reason of their use and character, are used by a large number of people, such for example as passenger trains and the like.

The invention is also particularly effective for destroying germs in the interior of rooms, such as hotel rooms, and is of course more particularly directed to the mattresses and bedding as well as the walls of such rooms. Hotel guests are of course not subjected to medical examination and the bedding used by one guest, that is, the mattress and pillows, are, after a mere change of bedding, as sheets and pillow-cases, used by the next guest. The present invention provides a means in which the mattress and pillows as well as the walls may, in a most efficient and expeditious manner, be thoroughly treated to avoid any lack of perfect cleanliness in this particular and insure practically a complete sanitary cleaning for the perfect security of the next occupant.

What I claim to be new is:

1. An accessory for vacuum cleaners, comprising an open ended chambered body formed with an upper and lower partition to define a liquid containing space, an air tube opening through both partitions, a delivery tube extending through the upper partition into operative relation to said air tube and terminating within the liquid containing space adjacent the lower partition, a tube connector removably engaging the lower end of said body and enclosing the open end of the air tube, and means for sealing the juncture between the body and tube connector.

2. An accessory for vacuum cleaners, comprising an open ended chambered body formed with an upper and lower partition to define a liquid containing space, an air tube opening through both partitions, a delivery tube extending through the upper partition into operative relation to said air tube and terminating within the liquid containing space adjacent the lower partition, a tube connector removably engaging the lower end of said body and enclosing the open end of the air tube, means for sealing the junction between the body and tube connector, and a head removably engaging the upper end of the body beyond the upper partition and enclosing the open ends of the air tube and delivery tube.

In testimony whereof I affix my signature.

LEO P. KELLER. [L. S.]